US011639983B2

(12) United States Patent
Roger et al.

(10) Patent No.: US 11,639,983 B2
(45) Date of Patent: May 2, 2023

(54) DISTRIBUTED RADAR SENSOR SYSTEM

(71) Applicant: Infineon Technologies AG, Neubiberg (DE)

(72) Inventors: Andre Roger, Munich (DE); Markus Bichl, Feldkirchen-Westerham (DE); Dian Tresna Nugraha, Munich (DE); Romain Ygnace, Brunnthal (DE)

(73) Assignee: Infineon Technologies AG, Neubiberg (DE)

( * ) Notice: Subject to any disclaimer, the term of this patent is extended or adjusted under 35 U.S.C. 154(b) by 189 days.

(21) Appl. No.: 17/302,328

(22) Filed: Apr. 30, 2021

(65) Prior Publication Data
US 2021/0255278 A1  Aug. 19, 2021

Related U.S. Application Data

(63) Continuation of application No. 16/049,982, filed on Jul. 31, 2018, now Pat. No. 10,996,311.

(30) Foreign Application Priority Data

Aug. 4, 2017  (DE) .......................... 102017117729.9

(51) Int. Cl.
*G01S 7/35* (2006.01)
*G01S 13/87* (2006.01)
(Continued)

(52) U.S. Cl.
CPC .............. *G01S 7/352* (2013.01); *G01S 7/003* (2013.01); *G01S 13/343* (2013.01);
(Continued)

(58) Field of Classification Search
CPC ........ G01S 7/352; G01S 7/003; G01S 13/343; G01S 13/584; G01S 13/87;
(Continued)

(56) References Cited

U.S. PATENT DOCUMENTS 4,801,939 A * 1/1989 Jones ...................... G01S 13/90
342/194
5,964,709 A * 10/1999 Chiang ................ A61B 8/4427
600/447
(Continued)

FOREIGN PATENT DOCUMENTS

| CN | 106932765 A | 7/2017 |
| DE | 102014002284 A1 | 8/2014 |
| DE | 102015007303 A1 | 12/2015 |

OTHER PUBLICATIONS

Wunsch S., et al., "Improved Detection by Peak Shape Recognition Using Artificial Neural Networks," IEEE Proc. of 82nd Vehicular Technology Conference (VTC Fall), Boston, MA, USA, Sep. 6-9, 2015, 5 pages.

*Primary Examiner* — Peter M Bythrow
(74) *Attorney, Agent, or Firm* — Harrity & Harrity, LLP

(57) ABSTRACT

A radar sensor is described herein. In accordance with one example embodiment the radar sensor includes a transmitter for transmitting an RF signal and a receiver configured to receive a respective back-scattered signal from at least one radar target and to provide a corresponding digital radar signal. The radar sensor further includes a processor configured to convert the digital radar signal into the frequency do-main thus providing respective frequency domain data and to compress the frequency domain data. A communication interface is configured to transmit the compressed frequency domain data via a communication link operably coupled to the communication interface. Furthermore, respective and related radar methods and systems are described.

20 Claims, 8 Drawing Sheets

(51) Int. Cl.
 *G01S 13/34* (2006.01)
 *G01S 7/00* (2006.01)
 *G01S 13/58* (2006.01)
 *G01S 13/931* (2020.01)

(52) U.S. Cl.
 CPC ............ *G01S 13/584* (2013.01); *G01S 13/87* (2013.01); *G01S 7/356* (2021.05); *G01S 13/931* (2013.01); *G01S 2013/93271* (2020.01); *G01S 2013/93272* (2020.01); *G01S 2013/93274* (2020.01); *G01S 2013/93275* (2020.01)

(58) Field of Classification Search
 CPC . G01S 2013/93275; G01S 2013/93274; G01S 2013/93271; G01S 2013/93272; G01S 13/931; G01S 2007/356; H01Q 1/40; H01Q 1/422
 See application file for complete search history.

(56) References Cited

U.S. PATENT DOCUMENTS

| | | | |
|---|---|---|---|
| 6,366,236 B1* | 4/2002 | Farmer | G01S 13/34 342/195 |
| 9,784,887 B1* | 10/2017 | Ulmer | B64D 1/08 |
| 10,670,698 B2 | 6/2020 | Melzer et al. | |
| 10,996,311 B2 | 5/2021 | Roger et al. | |
| 2003/0156054 A1* | 8/2003 | Ishii | G01S 7/003 342/111 |
| 2004/0160353 A1* | 8/2004 | Cirillo | H03M 7/30 342/25 R |
| 2007/0164894 A1* | 7/2007 | Sherman | G01S 13/9011 342/25 F |
| 2009/0267825 A1* | 10/2009 | Vetro | G01S 13/9027 342/25 R |
| 2014/0232586 A1* | 8/2014 | Ygnace | G01S 13/02 342/195 |
| 2014/0375491 A1* | 12/2014 | Roger | G01S 13/931 342/93 |
| 2015/0346321 A1* | 12/2015 | Jansen | G01S 7/02 342/107 |
| 2016/0018511 A1* | 1/2016 | Nayyar | G01S 7/03 342/27 |
| 2016/0131744 A1* | 5/2016 | Addison | G01S 7/354 342/196 |
| 2017/0045606 A1 | 2/2017 | Ygnace et al. | |
| 2017/0054449 A1* | 2/2017 | Mani | H03M 7/4031 |
| 2017/0131394 A1 | 5/2017 | Roger et al. | |
| 2017/0272148 A1* | 9/2017 | Wang | G01W 1/00 |
| 2017/0293025 A1* | 10/2017 | Davis | G01S 7/023 |
| 2017/0363711 A1* | 12/2017 | Rao | H04L 27/103 |
| 2018/0045810 A1* | 2/2018 | Ygnace | G01S 7/288 |
| 2018/0252809 A1* | 9/2018 | Davis | G01S 13/32 |

* cited by examiner

DISTRIBUTED RADAR SENSOR SYSTEM

RELATED APPLICATIONS

This application is a continuation of U.S. patent application Ser. No. 16/049,982, filed Jul. 31, 2018 (now U.S. Pat. No. 10,996,311), which claims priority under 35 U.S.C. § 119 to Germany (DE) Patent Application No. 102017117729.9, filed on Aug. 4, 2017, the contents of which are incorporated by reference herein in their entireties.

TECHNICAL FIELD

The present disclosure relates to the field distributed sensor systems, in particular to a system including one or more radar sensors for sensing distances and velocities.

BACKGROUND

Radar sensors can be found in numerous sensing applications, in which distances and velocities of objects are to be measured. In the automotive sector, there is an increasing demand for radar sensors used in so-called "adaptive cruise control" (ACC) or "radar cruise control" systems. Such systems may be used to automatically adjust the speed of an automobile so as to maintain a safe distance from other automobiles ahead. Particularly autonomous cars use numerous sensors such as radar sensors to detect and locate various objects in their surroundings. Information about position and velocity of objects in the surrounding of an autonomous car is used to navigate safely.

Modern radar systems make use of highly integrated RF circuits, which may incorporate all core functions of an RF front end of a radar transceiver in one single package (single chip transceiver). Such RF front ends usually include, inter alia, a local RF oscillator (LO), power amplifiers (PA), low noise amplifiers (LNA) mixers.

Frequency modulated continuous wave (FMCW) radar systems use radar signals whose frequency is modulated by ramping the signal frequency up and down. Such radar signals are often referred to as "chirp signals" or simply as chirps. A radar sensor usually radiates sequence of chirps using one or more antennas, and the radiated signal is backscattered by one or more objects (referred to as radar targets) located in the "field of view" of a radar sensor. The backscattered signals are received and processed by the radar sensor. The detection of the radar targets is usually accomplished using digital signal processing.

SUMMARY

A radar system is described herein. In accordance with one example embodiment, the system includes at least one radar sensor including a transmitter for transmitting an RF signal and a receiver configured to receive a respective back-scattered signal from at least one radar target and to provide a corresponding digital radar signal. Further, the system includes at least one communication link and a central radar signal processing unit connected to the at least one radar sensor via the communication link. The at least one radar sensor includes a processor configured to convert the digital radar signal into the frequency domain thus providing respective frequency domain data and to compress the frequency domain data. The central radar signal processing unit is configured to receive the compressed frequency domain data via the communication link, to decompress the compressed frequency domain data, and to detect the at least one radar target based on the decompressed frequency domain data.

In accordance with a further example embodiment the system includes at least one radar sensor including a transmitter for transmitting an RF signal and a receiver configured to receive a respective back-scattered signal from at least one radar target and to provide a corresponding digital radar signal with a first data rate. The system further includes a decimator receiving the digital radar signal and configured to reduce the first data rate to obtain the digital radar signal with a second data rate, which is lower than the first data rate. Additionally, the system includes at least one communication link and a central radar signal processing unit connected to the at least one radar sensor via the communication link. The central radar signal processing unit is configured to receive the digital radar signal with the second data rate via the communication link, to convert the digital radar signal into the frequency domain thus providing respective frequency domain data, and to detect the at least one radar target based on the frequency domain data.

Furthermore, a radar method is described herein. In accordance with one example embodiment, the method includes transmitting an RF signal and receiving a respective back-scattered signal from at least one radar target. The method further includes generating a digital radar signal representing the back-scattered signal, providing frequency domain data by converting the digital radar signal into the frequency domain, compressing the frequency domain data, and transmitting the compressed frequency domain data to a communication link. The method further includes decompressing the compressed frequency domain data received from the communication link to obtain a restored frequency domain data and detecting the at least one radar target based on the restored frequency domain data.

In accordance with a further example embodiment, the method includes transmitting an RF signal and receiving a respective back-scattered signal from at least one radar target, generating a digital radar signal with a first data rate representing the back-scattered signal, reducing the data rate of the digital radar signal to obtain the digital radar signal with a second data rate, and transmitting the digital radar signal to a communication link to a central radar processing unit. The method further includes providing frequency domain data by converting the digital radar signal into the frequency domain and detecting the at least one radar target based on the restored frequency domain data.

Moreover, a radar sensor is described herein. In accordance with one example embodiment the radar sensor includes a transmitter for transmitting an RF signal and a receiver configured to receive a respective back-scattered signal from at least one radar target and to provide a corresponding digital radar signal. The radar sensor further includes a processor configured to convert the digital radar signal into the frequency domain thus providing respective frequency domain data and to compress the frequency domain data. A communication interface is configured to transmit the compressed frequency domain data via a communication link operably coupled to the communication interface.

In accordance with another example embodiment the radar sensor includes a transmitter for transmitting an RF signal and a receiver configured to receive a respective back-scattered signal from at least one radar target and to provide a corresponding digital radar signal with a first data rate. A decimator receives the digital radar signal and is configured to reduce the first data rate to obtain the digital radar signal with a second data rate, which is lower than the first data rate. The radar sensor further includes a communication interface configured to transmit, with the second data rate, the digital radar signal via a communication link operably coupled to the communication interface.

BRIEF DESCRIPTION OF THE DRAWINGS

The disclosure can be better understood with reference to the following drawings and descriptions. The components in the figures are not necessarily to scale; instead emphasis is placed upon illustrating the principles of the disclosure. Moreover, in the figures, like reference numerals designate corresponding parts. In the drawings.

DETAILED DESCRIPTION

Figure 1:
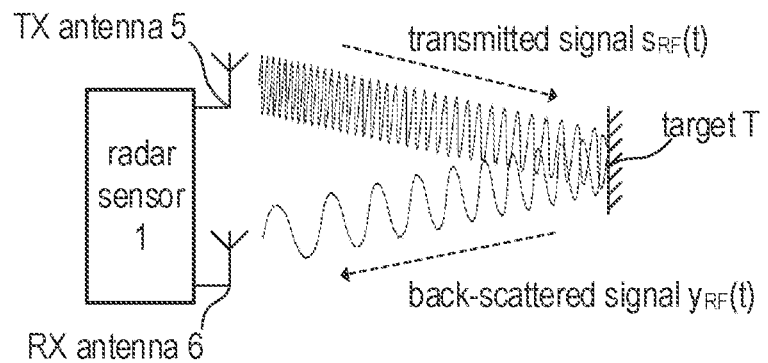
FIG. 1 is a sketch illustrating the operating principle of an FMCW radar system for distance and/or velocity measurement.

FIG. 1 illustrates a frequency modulated continuous wave (FMCW) radar sensor 1. In the present example, separate transmit (TX) and receive (RX) antennas 5 and 6, respectively, are used (bistatic or pseudo monostatic radar configuration). However, it is noted that a single antenna can be used so that the receive antenna and the transmit antenna are physically the same (monostatic radar configuration). The transmit antenna continuously radiates an RF signal sRF(t), which is frequency modulated, for example, by a saw tooth signal (periodic linear ramp signal). The transmitted signal sRF(t) is back-scattered at a target T, which is located in the radar channel within the measurement range of the radar device, and the back-scattered signal yRF(t) is received by the receive antenna 6. The back-scattered signal is denoted as yRF(t).

Figure 2:
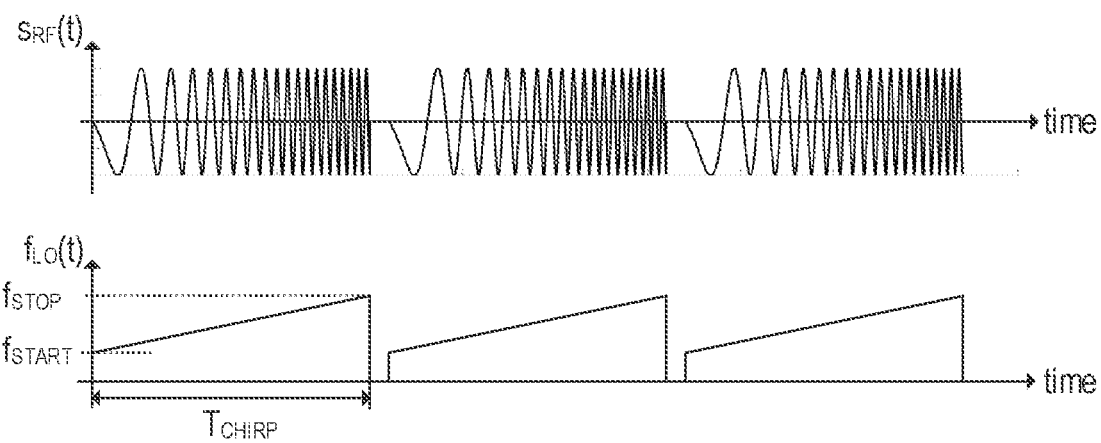
FIG. 2 includes two timing diagrams illustrating the frequency modulation of the RF signal used in FMCW radar systems.

FIG. 2 illustrates the mentioned frequency modulation of the signal sRF(t). As shown in the first diagram of FIG. 2, the signal sRF(t) is composed of a series of "chirps", i.e. a sinusoidal waveform with increasing (up-chirp) or decreasing (down-chirp). In the present example, the instantaneous frequency fLO(f) of a chip increases linearly from a start frequency fSTART to a stop frequency fSTOP within a defined time span TCHIRP (see second diagram of FIG. 2). Such a chirp is also referred to as a linear frequency ramp. Three identical linear frequency ramps are illustrated in FIG. 2. It is noted, however, that the parameters fSTART, fSTOP, TCHIRP as well as the pause between the individual frequency ramps may vary dependent on the actual implementation of the radar device 1. In practice the frequency variation may be, for example, linear (linear chirp, frequency ramp), exponential (exponential chirp) or hyperbolic (hyperbolic chirp).

Figure 3:
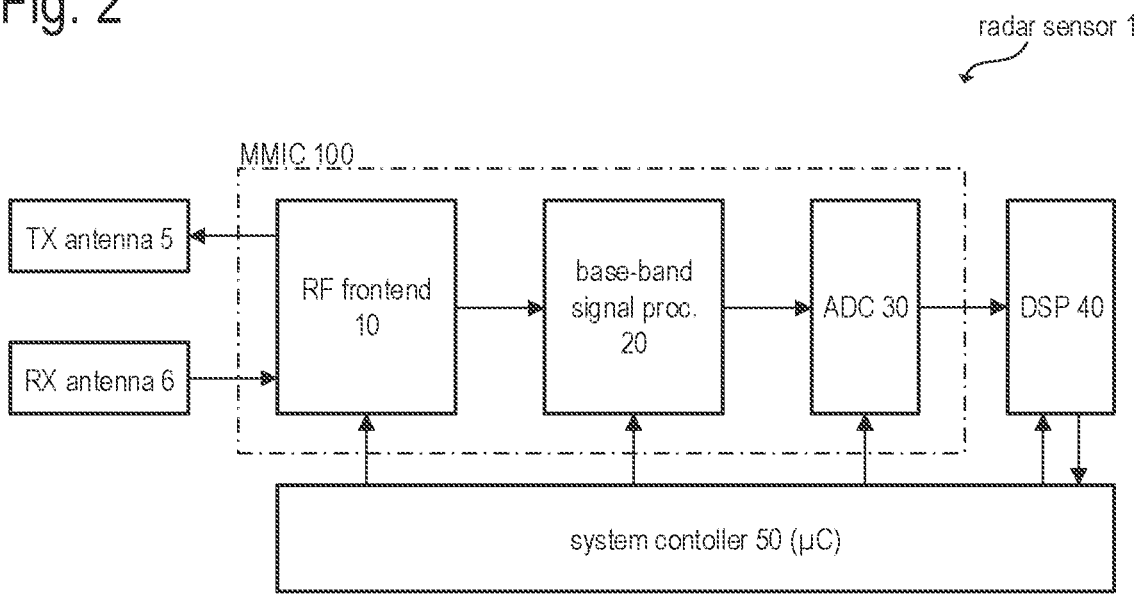
FIG. 3 is a block diagram illustrating the basic structure of an FMCW radar device.

FIG. 3 is a block diagram that illustrates an example structure of radar sensor 1. Accordingly, at least one transmit antenna 5 (TX antenna) and at least one receive antenna 6 (RX antenna) are connected to an RF frontend 10, which may be integrated in a semiconductor chip, which is usually referred to as monolithic microwave integrated circuit (MIMIC). The RF frontend 10 may include all the circuit components needed for RF signal processing. Such circuit components may include, for example, a local oscillator (LO), RF power amplifiers, low noise amplifiers (LNAs), directional couplers such as rat-race-couplers and circulators, and mixers for the down conversion of RF signals (e.g. the received signal yRF(t), see FIG. 1) into the base band or an IF band. It is noted that antenna arrays may be used instead of single antennas. The depicted example shows a bistatic (or pseudo monostatic) radar system, which has separate RX and TX antennas. In case of a monostatic radar system, a single antenna or a single antenna array may be used for both, receiving and transmitting electromagnetic (radar) signals. In this case a directions coupler (e.g. a circulator) may be used to separate RF signals to be transmitted to the radar channel from RF signals received from the radar channel.

In case of a frequency modulated continuous wave (FMCW) radar sensor, the transmitted RF signals radiated by the TX antenna 5 may be in the range between approximately 20 GHz (e.g. 24 GHz) and 81 GHz (e.g. 77 GHz in automotive applications). As mentioned, the RF signal received by the RX antenna 6 includes the radar echoes, i.e. the signal, that have been back-scattered at the so-called radar targets. The received RF signal yRF(t) are down converted into the base band and further processed in the base band using analog signal processing (see FIG. 3, base band signal processing chain 20), which basically includes filtering and amplification of the base band signal. The base band signal is finally digitized using one or more analog-to-digital converters 30 and further processed in the digital domain (see FIG. 3, digital signal processing chain implemented, e.g., in digital signal processor 40). The overall system is controlled by a system controller 50, which may be at least partly implemented using a processor such as a microcontroller executing appropriate firmware. The digital signal processor 40 may be part of the system controller 50 or separate therefrom. The RF frontend 10 and the analog base band signal processing chain 20 (and optionally the ADC 30) may be integrated in a single MMIC. However, the components may be distributed among two or more integrated circuits.

Figure 4:
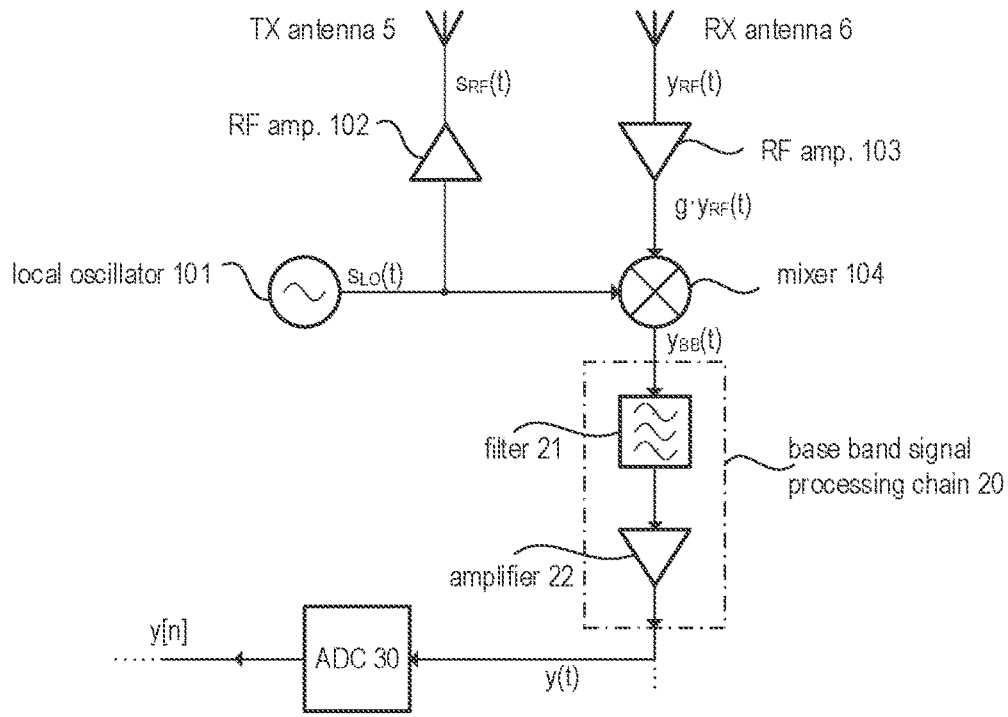
FIG. 4 is a circuit diagram illustrating one example of an analog RF frontend, which may be included in the FMCW radar device of FIG. 3.

FIG. 4 illustrates one example implementation of the RF frontend 10, which may be included in the radar sensor shown in FIG. 3. It is noted that FIG. 4 is a simplified circuit diagram illustrating the basic structure of an RF frontend. Actual implementations, which may heavily depend on the application, are of course more complex. The RF frontend 10 includes a local oscillator (LO) 101 that generates a RF signal sLO(t), which may be frequency modulated as explained above with reference to FIG. 2. The signal sLO(t) is also referred to as LO signal. In radar applications, the LO signal is usually in the SHF (Super High Frequency) or the EHF (Extremely High Frequency) band, e.g. between 76 GHz and 81 GHz in automotive applications.

The LO signal sLO(t) is processed in the transmit signal path as well as in the receive signal path. The transmit signal sRF(t), which is radiated by the TX antenna 5, is generated by amplifying the LO signal sLO(t), e.g., using an RF power amplifier 102. The output of the amplifier 102 is coupled to the TX antenna 5 e.g. via strip lines, a coupler, etc. The received signal yRF(t), which is provided by the RX antenna 6, is provided to a mixer 104. In the present example, the received signal yRF(t) (i.e. the antenna signal) is pre-amplified by RF amplifier 103 (gain g), so that the mixer receives the amplified signal g·yRF(t) at its RF input. The mixer 104 further receives the LO signal sLO(t) at its reference input and is configured to down convert the amplified signal g·yRF(t) into the base band. The resulting base band signal at the mixer output is denoted as yBB(t). The base band signal yBB(t) is further processed by the analog base band signal processing chain 20 (see also FIG. 3), which basically includes one or more filters (e.g. a band pass 21) to remove undesired side bands and image frequencies as well as one or more amplifiers such as amplifier 22). The analog output signal, which may be supplied to an analog-to-digital converter (cf. FIG. 3) is denoted as y(t).

In the present example, the mixer 104 down converts the RF signal g·yRF(t) (amplified antenna signal) into the base band. The respective base band signal (mixer output signal) is denoted by yBB(t). The down conversion may be accomplished in a single stage (i.e. from the RF band into the base band) or via one or more intermediate stages (from the RF band into an IF band and subsequently into the base band). The analog output signal y(t) may be digitized using analog-to-digital converter 30 (see FIG. 3, not shown in FIG. 4), and the respective digital output signals is denoted as y[n].

Figure 5:
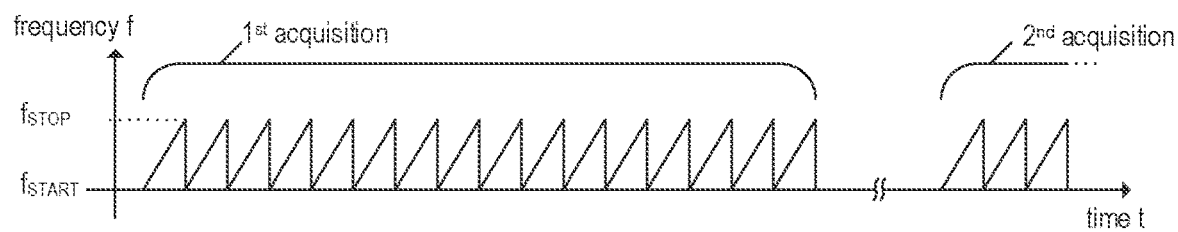
FIG. 5 is a timing diagram illustrating sequence of chirps used for data acquisition in a radar sensor.

FIG. 5 schematically illustrates an example FM scheme as usually implemented in FMCW radar sensors. In the depicted example, a sequence of sixteen up-chirps is transmitted for one data acquisition. It is noted that, in practice, a chirp sequence usually includes much more chirps (e.g. 256 chirps) and the present example has been simplified for illustration purposes only. One example signal processing method for evaluating the radar echoes is illustrated in FIG. 6.

Figure 6:
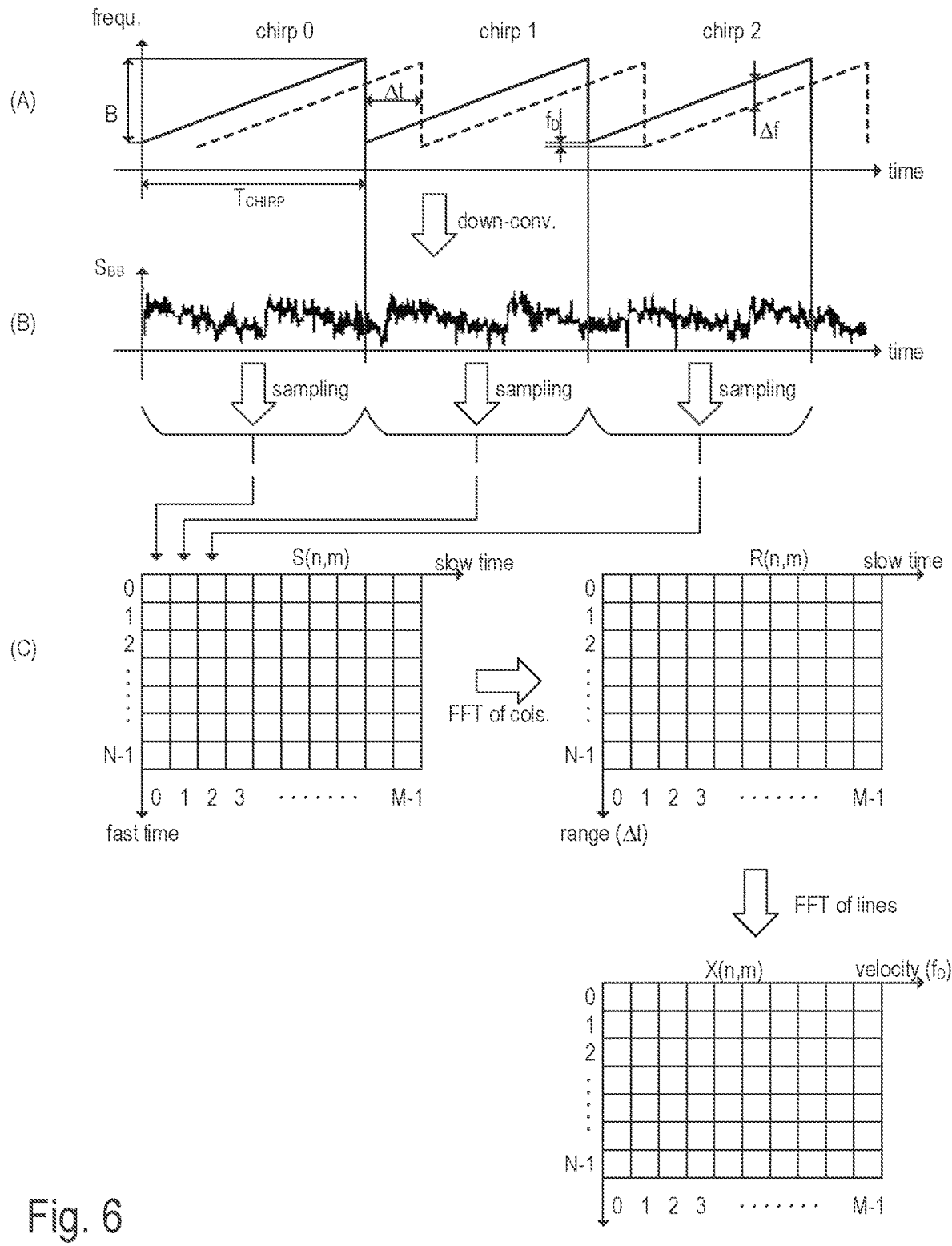
FIG. 6 illustrates the concept of Range Doppler Signal Processing commonly used in radar sensors.

FIG. 6 illustrates the measurement principle used by a FMCW radar sensor that radiates a frequency modulated radar signal, which is modulated using a sawtooth shaped modulation signal. Diagram (a) of FIG. 6 illustrates the frequency over time of an outgoing radar signal (solid line, cf. FIG. 4, signal sRF(f)) and the respective incoming radar signal (dashed line, cf. FIG. 4, signal yRF(t)). Accordingly, the frequency of the outgoing radar signal linearly increases from a start frequency fSTART to a stop frequency fSTOP, then falls back to fSTART and again increases until the stop frequency fSTOP is reached, and so on. As mentioned before with reference to FIG. 5, the outgoing radar signal is composed of a sequence of "frequency ramps" also referred to as "chirp pulses" or "chirps". Dependent on the application a defined modulation pause may be inserted between two subsequent chirps, wherein the radar signal may remain at the stop frequency or the start frequency during the pause (or any frequency between stop and start frequency). The duration of one chirp may be in the range from a few microseconds up to a few milliseconds, e.g. 50 µs to 2000 µs. The actual values may be, however, greater or lower dependent on the application.

The incoming radar signal (received by the antenna) lags with respect to the outgoing radar signal (radiated by the antenna) by a time lag $\Delta t$ due to the travel time of the radar signal from the antenna to the radar target (at which the radar signal is back-scattered) and back to the antenna. The time lag $\Delta t$ is often referred to as round trip delay RTD. The distance dT of the radar target from the radar sensor is dT=c·$\Delta t$/2, i.e., the speed of light c times half of the time lag $\Delta t$. As can be seen from FIG. 6, diagram (a), the time lag $\Delta t$ results in a frequency shift $\Delta f$ (beat frequency), which can be measured by down mixing the incoming signal (see FIG. 4, mixer 104) and subsequent digital spectral analysis. When using a linear chirp (i.e. a sawtooth shaped modulation signal) the time lag $\Delta t$ can be calculated as $\Delta t = \Delta f/k$, wherein the factor k is the steepness of the frequency ramp, which can be calculated as k=(fSTOP−fSTART)/TCHIRP.

Although the basic operation principle of a FMCW radar sensor has been outlined above, it should be noted that more sophisticated signal processing can be applied in practice. In particular, an additional frequency shift fD of the incoming signal due to the Doppler effect may cause an error in the distance measurement because the Doppler shift fD adds to the frequency shift $\Delta f$, which is due to the travel time of the radar signal as explained above. Dependent on the application the Doppler shift may also be estimated from the outgoing and incoming radar signals, and in some application the Doppler shift may be negligible for distance measurement. This may be particular the case, when the chirp duration TCHIRP is short, so that the frequency shift $\Delta f$ is high as compared with the Doppler shift fD for any distance within the measuring range of the radar sensor. In the present example, the frequency of the radar signal increases from fSTART to fSTOP, which results in a so-called "up-chirps". However, the same measurement techniques can be applied with "down-chirps", that is when the stop frequency fSTOP is lower than the start frequency fSTART and the frequency decreases from fSTART to fSTOP during a chirp. In some radar systems, the Doppler shift may be eliminated, when the distance is calculated based on an "up-chirp" and on a "down-chirp". The actually measured distance dT of a radar target can be calculated as the average of a distance value obtained from the up-chirp echo and a distance value obtained from the down-chirp echo; by the averaging the Doppler shift cancels out. However, these basic signal processing techniques are as such known in the field of FMCW radars and are thus not explained here in more detail.

The standard signal processing of digital FMCW radar signals (see FIG. 3, DSP 40) includes the calculation of Range-Doppler Maps (also referred to as Range-Doppler Images). Generally, linear FMCW radars obtain target information (i.e. distance and velocity of a radar targets) by transmitting a sequence of linear chirps and mixing the delayed echoes (see FIG. 4, signal yRF(t)) from the targets with a copy of the transmitted signal (see FIG. 4, mixer 104). The target range information can be extracted from the spectrum of this mixed signal (i.e. from the resulting beat frequency). A Range-Doppler map can be obtained after coherent integration of several chirps. Range-Doppler maps can be used as a basis for various identification and classification algorithms. The distance dT of the radar target from the radar sensor may be calculated as $$dT = c \cdot \Delta f \cdot TCHIRP/(2 \cdot B),$$

wherein Δf denotes the beat frequency and B the bandwidth of the chirp (B=|fSTOP−fSTART|). Accordingly, the basic signal processing of linear FMCW radar is to determine the beat frequency. When the radar target is moving, the Doppler effect has to be considered to determine the information of the radar target's velocity (relative to the radar sensor), which can be done based on the mentioned Range-Doppler maps, which can be calculated using so-called Range-Doppler Processing.

The common method for calculating the Range-Doppler maps is a two-dimensional Fourier Transform, which is usually implemented using a Fast Fourier Transform (FFT) algorithm. Accordingly, a first FFT is applied to the N samples of each chirp to obtain the range information (obtained from the beat frequency), and a second FFT is applied to the sequence of samples taken from M consecutive chirps (e.g. the n-th sample of M consecutive chirps, n=0, 2, ..., N−1) to obtain Doppler information. The result of the Range-Doppler Processing may be organized in a M×N matrix X(m, n) referred to as Range-Doppler map.

The Range-Doppler Processing is schematically illustrated in FIG. 6. The first diagram (diagram a) of FIG. 6 illustrates a sequence of chirps similar as in FIG. 5. The solid line represents the transmitted chirps (see FIG. 4, signal sRF(t)) and the dashed lines the corresponding radar echo (e.g. FIG. 4, signal yRF(t)). The second diagram (diagram b) of FIG. 6 illustrates the down converted base band signal, e.g. signal y(t) in the example of FIG. 4. This signal is digitized (i.e. sampled and quantized), wherein the sampling time interval is chosen such that each chirp is represented by N samples. Thus, when M subsequent chirps are digitized (precisely speaking, the resulting base band signal is digitized), a number of N times M samples are obtained, which can be arranged in a N×M matrix S(n, m) as shown in the third diagram of FIG. 6 (diagram c). In the example of FIG. 6, diagram c, the index n denoting the line number of the matrix (n=0, 1, 2, ..., N−1) can be regarded as fast time index (temporal distance between two subsequent samples along the individual columns is TCHIRP/N), wherein the index m denotes the column of the matrix (m=0, 1, 2, ..., M−1) can be regarded as slow time index (temporal distance between two subsequent samples along the individual lines is TCHIRP). The Range-Doppler map X(n, m) may be obtained by applying a first FFT along the fast time axis (resulting in the Range-Time map R(n, m) that includes range information) and subsequently a second FFT along the slow time axis (resulting in the Range-Doppler map X(n, m)). That is, in the first stage an FFT is calculated for each column and, in the second stage, a FFT is calculated for each line of the matrix shown in FIG. 6. It is noted, that a Range-Doppler map X(n,m) can be calculated from the (down converted and digitized) radar signal received from a specific antenna. If more than one receive antenna (i.e. receive channel) is used, a Range-Doppler-Map Xr(n,m) may be calculated for each antenna (the index r denoting a specific antenna of an antenna array. The r corresponding Range-Doppler-Maps Xr(n,m) may be regarded as a three dimensional array that is usually referred to as "radar data cube" (frequency domain data).

As mentioned the Range Maps R(n,m), the Range-Doppler maps X(n,m) or the radar data cubes may be used as input data for various signal processing techniques for detecting radar targets in the surrounding (field of view) of the radar sensor. For example, several threshold techniques are known to detect peaks (i.e. local maxima) in the Range Map or the Range-Doppler Map caused by objects (radar targets) in the radar channel. That is, a target is detected if value in the Range Map or the Range Doppler Map exceeds a specific threshold. However, noise and clutter included in the radar signals may give rise to false detections (referred to as false alarm), and the false alarm rate (FAR) is a relevant parameter in radar signal processing. One specific technique uses an adaptive threshold to achieve a constant false alarm rate (CFAR). Various CFAR detection algorithms are known in the field of radar signal post processing and thus not further discussed here in detail. Recently, more complex detection algorithms like, for example, artificial neural networks (ANNs) have been used to improve the quality of detection of radar targets within noisy environments (see, e.g., S. Wunsch, J. Fink, F. K. Jondral: Improved Detection by Peak Shape Recognition Using Artificial Neural Networks, in: IEEE Proc. of 82nd Vehicular Technology Conference (VTC Fall), Boston, Mass., USA, 6-9 Sep. 2015). The output of any thresholding technique (like CFAR or any other detection technique) is a list of peaks present, e.g., in the Range-Doppler Maps (FFT peaks). Additional signal processing steps are performed to obtain, from the FFT peaks, a list of radar targets herein denoted as T(i), wherein i is the index of the detected radar target.

Figure 7:
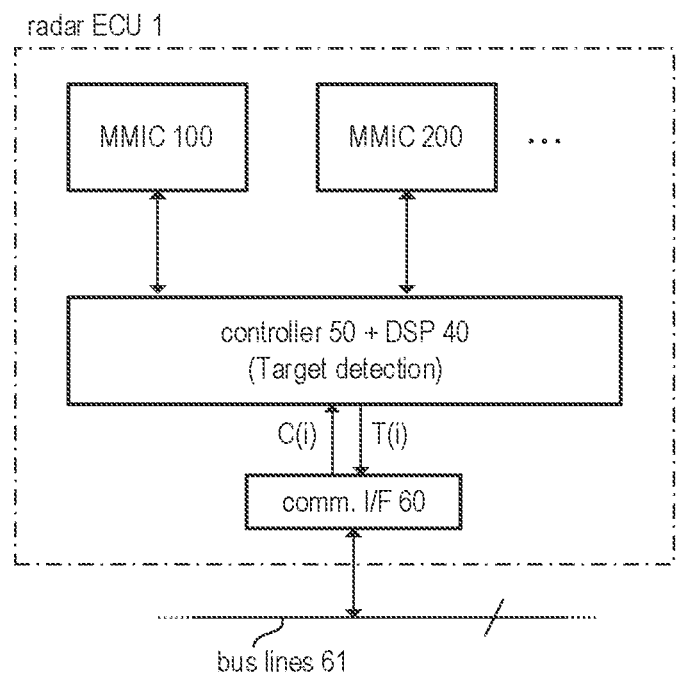
FIG. 7 illustrates one example structure of a radar ECU, which may be used in a vehicle.

FIG. 7 illustrates one example structure of a radar sensor, which may be used, for example, in a vehicle to detect objects and persons in the surrounding of the vehicle. In automotive applications, a radar sensor is usually referred to as radar ECU (electronic control unit), which denotes a separate physical entity (a module). As illustrated in FIG. 7, a radar ECU may include one or more MMICs 100, 200, etc., wherein each MMIC may include the RF frontend, the analog base band signal processing and the analog-to-digital conversion as previously shown in FIG. 3. Each MMIC may be configured to receive signals from one or more antennas (receive channels). The MMIC(s) are connected to controller 50 (which may include DSP 40), which are configured to compile the received radar data cubes and apply the mentioned detection techniques (such as a CFAR detection algorithm) to the data included in the radar data cubes (e.g. in the Range-Doppler Maps for the individual receive channels). For this purpose, the controller 50 and the DSP may be programmed with appropriate software and/or firmware. The controller 50 and/or the DSP 40 may be programmed to generate, based on the detected FFT peaks (using, e.g. CFAR detection methods), a list of detected radar targets T(i) and associated information (e.g. velocity, direction of arrival, classification of radar target, etc.), which may be digitally communicated to a superordinate control unit via communication interface 60, which is connected to a communication bus 61. Communication bus 61 may be any serial or parallel bus for transmitting digital data, such as CAN (Controller Area Network), Ethernet, Flex Ray, SPI (Serial Peripheral Interface) or the like.

Figure 8:
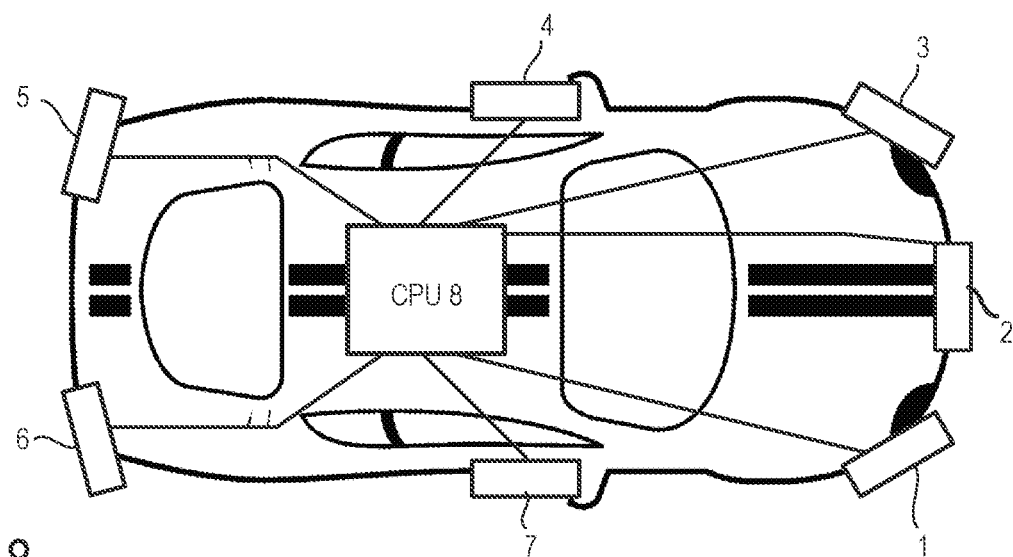
FIG. 8 illustrates an example distributed radar sensor system installed in an automobile.

It is noted that, depending on the detection algorithm(s) used in the radar ECU 1 (radar sensor), the controller 50 and/or the DSP may have to provide significant computational power in order to detect the radar targets in real time (particularly when processing data received from several radar ECUs). In the examples described herein, the computational power of the radar ECUs is partly "relocated" in one central radar target post processing unit. Accordingly, only some basic calculations remain in the radar ECU, e.g. the calculation of the mentioned Fourier transforms needed for calculating the Range Maps and Range-Doppler Maps for identifying the relevant peaks (based on which the data compression may be done). Additionally, the direction of arrival (DoA) may optionally be calculated from the Range-Doppler Maps in the radar ECUs. FIG. 8 illustrates schematically one example of using a distributed system of radar sensors in a vehicle. Radar sensors 1-7 (radar ECUs) are distributed over a vehicle, wherein radar sensors 1, 2, and 3 are arranged on the front side of the car, radar sensors 5 and 6 are arranged on the rear side of the car and radar sensors 4 and 7 are arranged on the driver and the passenger side of the car. The radar sensors 1-7 are coupled with a central radar target post processing unit 8, e.g. via a communication bus. The central radar target post processing unit 8 includes a processor (e.g. a CPU) configured to detect one or more radar targets (i.e. objects, persons, etc.) based on the received information from each radar sensor or based on cumulated information received from the radar sensors 1-7. For detection the radar targets, the radar target detection unit 8 may use more complex algorithms as compared to the algorithms currently used in radar sensors. In some embodiment sensor fusion techniques are applied to combine information obtained from the radar sensors with information obtained by other types of sensors (e.g. a camera).

The distributed radar sensor system with central radar post processing unit 8 allows for a detection of radar targets (i.e. objects, persons, etc.) based on the sensor information provided by two or more individual radar sensors. For example, a peak in the Range Map obtained from radar sensor 1 may be too low for being identified as a radar target. However, a corresponding peak may be present in the Range Map obtained from the neighboring radar sensor 2. Central post processing unit 8 is able to evaluate the information obtained from both sensors 1 and 2 and thus may be able to detect the radar target due to the fact that it appears in the Range-Doppler Maps provided by one or more of the radar sensors. In contrast, radar sensors such as the sensor shown in FIG. 7, which have an internal radar target detection and do not have a central post processing, are only able to detect radar targets based on the sensor information acquired by the sensor itself.

Centralizing the radar post processing entails a high amount of sensor data having to be exchanged between the individual radar sensors and the central post processing unit. For most detection algorithms the central post processing unit needs the information included in the radar data cubes (i.e. the Range Maps (first stage FFT) and/or the Range-Doppler Maps (second stage FFT)). Dependent on the actual application and the number of radar sensors, the communication link connecting the central post processing unit with the individual radar sensors would have to allow for data rates in the range of gigabits per second, which is significantly higher than the maximum data rate for standard communication links such as CAN (Controller Area Network) or 100 MBit Ethernet (100BASE-T).

Figure 9:
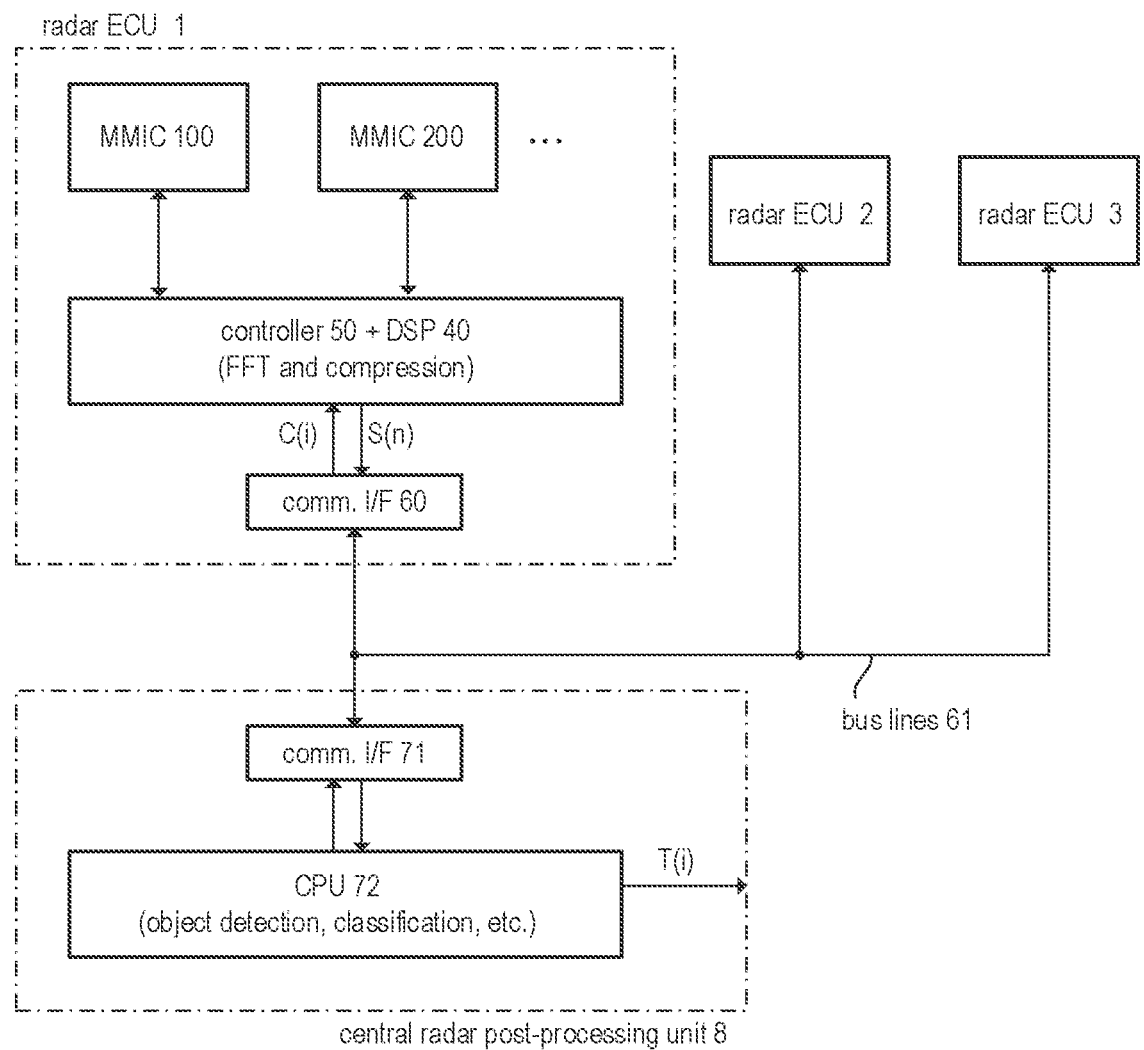
FIG. 9 illustrates one example implementation of the distributed radar sensor system of FIG. 8 in more detail.

FIG. 9 illustrates a system including a radar ECU 1 (radar sensor) and a central post processing unit 8 connected by a communication link 9. In order to compress the sensor data (e.g. Range-Doppler-Maps, DoA information) accruing in a radar sensor while allowing the central radar post processing unit 8 to run target detection and classification algorithms, the Radar ECU is may be configured to run the computing steps shown in FIG. 11 (see also description further below). In doing the compression, it may be important not to compress the sensor data too heavily so that FFT peaks, which would be recognized as valid radar targets in the central radar post processing unit, are not lost due to the signal processing (compression) done in the radar sensor(s). For this reason, the thresholding technique executed in the radar sensor(s) may be less selective as compared to existing radar sensors (which do not use central radar post processing for target detection). For example, the thresholding technique executed in the radar sensor(s) may be configured to detect, e.g., 10% more FFT peaks than necessary in a conventional radar sensor. Once the FFT peaks are detected/selected in a radar sensor, the local software algorithm executed in the radar sensor may decide whether to add spectral values (spectral lines, frequency bins) in the Range and/or in the Doppler dimension(s), which are adjacent to the spectral line of the detected peak. Optionally, to further compress the sensor data, the sensor could compute the azimuth angle and elevation angle (that is the DoA detection) to avoid the need for sending information obtained from each individual antenna of an antenna array (or virtual antenna array). To summarize the above, to reduce the data to be sent via the communication link the sensor data—e.g. the frequency domain data such as Range Map or Range-Doppler Map—is compressed before being communicating the compressed sensor data S(n) across the communication link. The compression of the sensor data may be implemented in DSP 40 of each radar ECU, e.g. using appropriate software instructions.

Decompression of the sensor information is done in the central postprocessing unit 8 and the decompressed sensor data is used as input data for the remaining computing stages of the radar signal processing (e.g., valid peak detection, target detection and classification, target tracking, etc.) implemented in the central post processing unit. To decompress the received data it may be assumed, for example, that the spectral values (spectral lines, frequency bins), which have been omitted in the radar ECU(s) to compress the data, are zero. In the depicted example of FIG. 9, the radar ECU 1 includes a communication interface 60. The further radar ECUs 2 and 3 may be implemented in a similar manner. The central radar processing unit 8 may also include communication interface 71 for communicating with the radar ECUs via the communication link. The central radar processing unit 8 my further include a processor 72 such as a CPU (Central Processing Unit), configured to execute software instructions. As mentioned, the radar target detection algorithm may at least partly be implemented as software. The communication link may be any common bus system like CAN, Ethernet (e.g. 100BASE-T), Flex Ray or the like. Due to the mentioned compression, medium data rates are sufficient for the communication between the radar ECUs 1, 2, and 3 and the central post processing unit 8. However, in alternative embodiments such as the example of FIG. 13, a high-speed serial data link is used, which is capable to handle data transfer rates in the range of gigabits per second.

Figure 10:
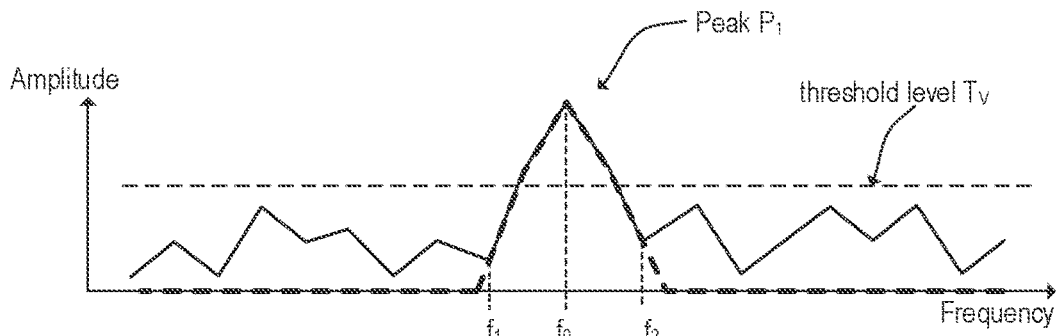
FIG. 10 is a timing diagram illustrating one example of how data compression is achieved in the embodiments described herein.

FIG. 10 illustrates an example waveform of a sequence of spectral lines (i.e. frequency bins or FFT values for a specific discrete frequency) in the Range dimension (cf. FIG. 6, columns of Range-Doppler Map X(n,m)) or in the Doppler dimension (cf. FIG. 6, lines of Range-Doppler Map X(n,m)) or in the Range-Doppler dimension (cf. FIG. 6, diagonals of Range-Doppler Map X(n,m)), wherein the waveform includes one or more peaks to be detected. The novel radar sensor concept shown FIG. 9 aims at the radar sensor running a peak detection algorithm to only preselect FFT peaks (without performing an target detection), whereas the radar sensor of FIG. 7 selects the FFT peaks and subsequently performs the target detection based on the selected peaks. According to the method shown in FIG. 11, while complex algorithms like CFAR could be still used for preselecting the FFT peaks, the parameters of the CFAR algorithms can be relaxed to avoid "loosing" FFT peaks, which might be detected as representing a real radar target when using the more complex post processing technique performed in the central radar processing unit 8. This could be done by changing the conditions so that the central post processing will discard at least 10 percent of the FFT detected peaks. Alternatively to CFAR algorithms, the processing technique shown in FIG. 11 allows for using much simpler algorithm like a simple thresholding technique. To summarize the above, different from common approaches, the peak detection in the radar sensor is not used for detecting radar targets (i.e. identifying position and velocity of the radar targets), but rather to compress the sensor data, which needs to be transferred to the central radar processing unit 8, by preselecting the FFT peaks subsequently processed in the central radar processing unit 8. Thus, the sensitivity of the preselection may be chosen comparably high (i.e. the threshold may be chosen comparably low) in order to detect more peaks as compared to a conventional approach. In this regard, it is noted that, for the purpose of data compression, it is not relevant whether a detected peak is caused by a real radar target or by noise or clutter.

In order to achieve a reduction/compression of data, all values except the detected peaks and a specific number of neighboring values (frequency bins) are discarded for the purpose of data transmission to the central radar post processing unit 8, which allows a significant reduction of the data to be transmitted via the communication link. That is, the compression of the radar data cubes is a lossy compression in the examples described herein. The dashed line in FIG. 10 illustrates the resulting compressed signal, wherein for the purpose of illustration the not selected FFT bins are set to zero. As shown in FIG. 10, not only the peak value P1 at frequency f0 is kept (i.e. not set to zero) but also the neighboring values (i.e. FFT bins at frequencies f1 and f2). In the present example, all values within a specific bandwidth f2−f1 around the center frequency f0 of a detected peak (e.g. values within the main lobe of the respective peak) are kept. This allows the central radar processing unit 8 to analyze the shape of a peak (e.g. the main lobe or parts thereof) and not only the peak value P1 itself for improved radar target detection and classification.

Figure 11:
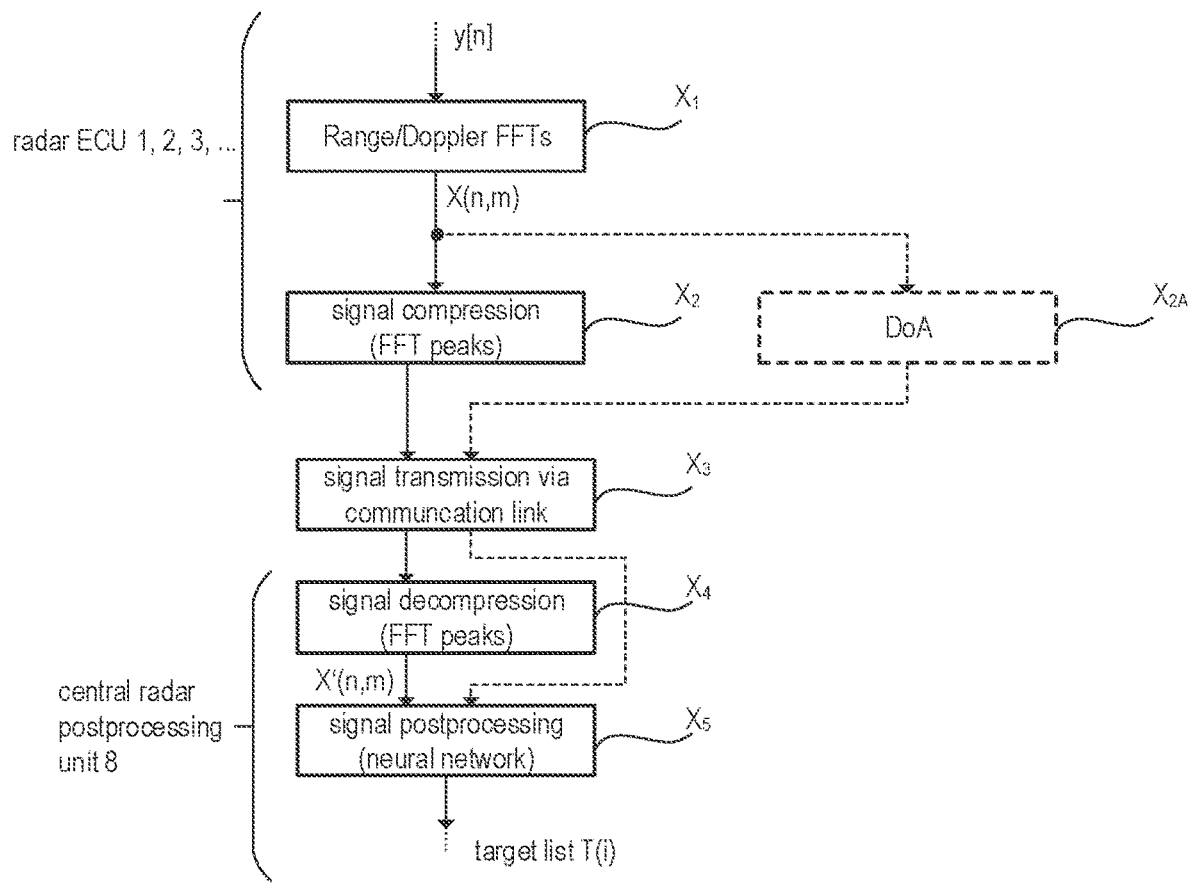
FIG. 11 is a flow chart illustrating one example embodiment of a radar signal processing method executed partly in radar ECUs and partly in a central radar post processing unit.

As mentioned, the actual detection/classification of radar targets may be accomplished in the central radar processing unit 8 for all connected radar ECUs. In the central radar processing unit 8 the data (e.g. the compressed Range-Maps or Range-Doppler Maps) received from the radar ECUs may be decompressed (reconstructed) by inserting zero values for those FFT bins, which have been omitted in the data transmission (zero padding). However, the information relevant for the detection of radar targets—i.e. the detected peaks and the shape of the respective main lobes—is not modified and still included in the decompressed data. The flow chart of FIG. 11 illustrates by way of example the function of a distributed radar sensor system as illustrated in FIGS. 8 and 9. Accordingly, steps X1 and X2 (and optionally step X2A) are executed by each one of the radar ECUs 1, 2, 3 etc. Step X3 represents the data transmission across the data link (see FIG. 9), and steps X4 and X5 are executed (e.g. for all radar ECUs) by the central radar post processing unit 8. As mentioned above, digital frequency domain sensor data such as Range Maps and/or Range-Doppler Maps X (n, m) are calculated (step X1) from the digitized base band signal y[n] provided by the base band signal processing chain 20 and the ADC 30 connected downstream thereto (cf. FIGS. 3 and 4). Subsequently, the sensor data included in the Range Maps and/or Range-Doppler Maps is compressed. In the examples described herein, the data compression is achieved by identifying peaks (local maxima) and discarding values outside the main lobes of the detected peaks to zero (step X2, see also FIG. 10). Thus, signal values for adjacent FFT bins in the Range and/or in the Doppler dimensions (see frequencies f1 and f2 in FIG. 10) may optionally be considered in addition to the detected peak values.

As mentioned above, the zero values between the detected peaks need not to be explicitly transmitted to the central radar post processing unit, which may lead to a significant reduction of the data to be transmitted (step X3). Accordingly, the values between the detected main lobes of the peaks may implicitly be set to zero by simply not transmitting these values to the central radar post processing unit 8. In this central radar post processing unit 8, the compressed signals received from the radar ECU(s) 1, 2, 3, etc. are decompressed (i.e. restored), which may be dome by zero padding the "gaps" between the main lobes of the detected peaks (step X4). Finally, the decompressed signal(s) (restored Range Doppler Maps X'(n, m)) are further processed to detect radar targets (step X5). As mentioned one or more neural networks can be used to improve the quality and reliability of the detection as compared with "traditional" threshold techniques.

As illustrated in FIG. 11, the direction of arrival (DoA) may optionally be determined in the radar ECUs 1, 2, 3, e.g. by evaluating the Doppler frequencies included in the radar data cube, e.g. from the Range-Doppler maps obtained for different receive channels (step X2A). The determined DoA data may also be transferred via the serial communication link and further processed in the central radar post processing unit 8. In some embodiments, however, step X2A may be omitted in the radar ECU, and the information concerning the direction of arrival may be determined in the central radar post processing unit 8 (signal post processing step X5).

Figure 12:
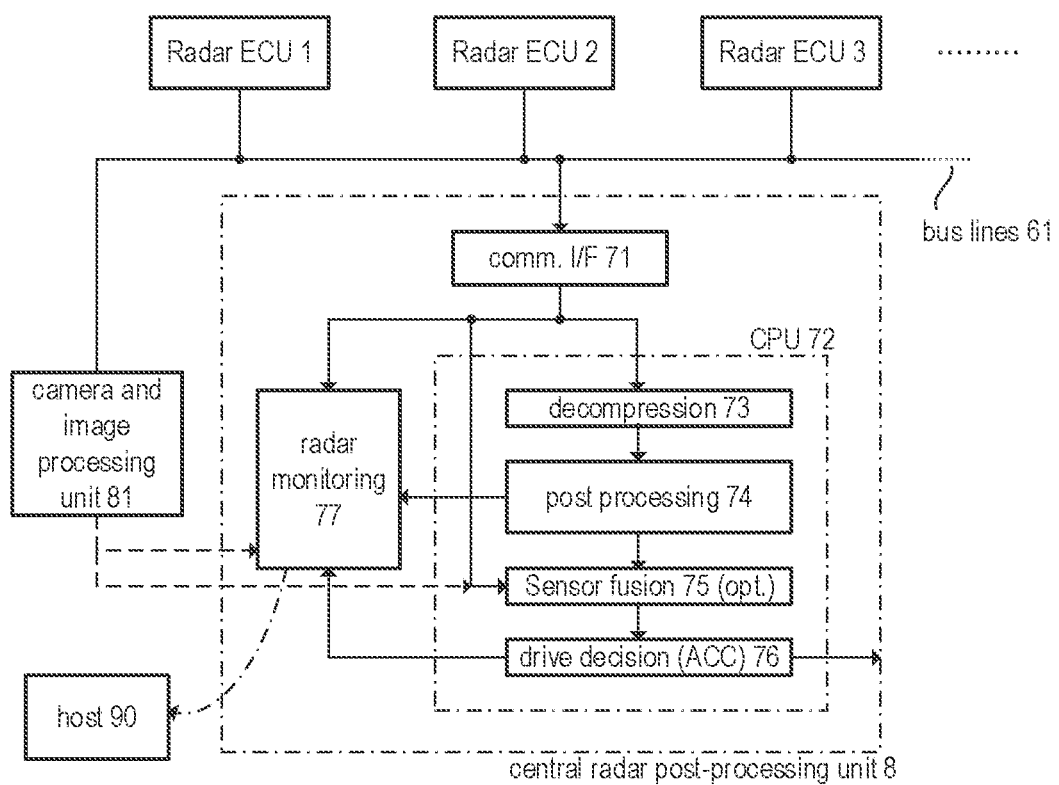
FIG. 12 schematically illustrates one example of the central radar post processing unit.

FIG. 12 schematically illustrates one example of the central radar post processing unit 8 in more detail. Similar as in the example of FIG. 9, the central radar post processing unit 8 includes a communication interface, for communicating, via a communication link, with other ECUs such as, for example, radar ECUs 1, 2, and 3, and (optionally) with the camera and image processing unit 81. In the present example, functional units 73 to 77 represent functions that are implemented as software and executed by CPU 72. It is understood, however, that these functions may also implemented—at least partly—using dedicated hardware or other processors different from CPU 72. Functional unit 73 (decompression, signal restoration) is configured to restore the Range Doppler Maps from the compressed date received from the Radar ECUs 1, 2, 3, etc. via the communication link (cf. FIG. 11, steps X4 and X4a). These Range Doppler Maps X'(n, m) are supplied to functional unit 74, which includes one or more artificial neural networks that are used to detect radar targets based on the restored Range Doppler Maps X'(n, m). The output of functional block 74 is a list of detected radar targets T(i) (i.e. their position and velocity).

The central radar post processing unit 8 may also include function unit 75, which is configured to combine data from other sensors with the information (list T(i) of detected targets) obtained from the radar post processing unit 74. This technique of combining sensor data is usually referred to as "sensor fusion" and as such known. In the present example, the sensor data obtained from a camera and subsequent image processing (implemented, e.g., in ECU 81) is combined with the list T(i) of radar targets.

However, the use of additional non-radar sensors and the sensor fusion unit 75 are optional. Finally, the combined sensor data provided by sensor fusion unit 75 may be provided to a drive decision unit 76, which may be configured to decide about a drive maneuver (e.g. deceleration, braking, acceleration, changing the steer angle, etc.) based on the combined sensor information. The drive decision unit may be regarded as part of an autonomous cruise control (ACC) system or part of the controller of an autonomous car. It is understood that functional units 75 (sensor fusion) as well as functional unit 76 (drive decision unit) may be implemented in a separate ECU and arranged remotely from the central radar post processing unit 8 but connected thereto, e.g. via the communication link.

Further shown in FIG. 12 is the radar monitoring unit 77 (functional unit) that is configured to monitor and record all or some of the compressed data received from each Radar ECUs 1,2,3, etc. and also record the corresponding output data from the post processing (e.g. in functional unit 74). In some embodiments, the monitoring unit 77 may be implemented in a separate ECU. Basically, the monitoring unit 77 may be configured to store the above-mentioned data to a non-volatile memory. The data stored in the non-volatile memory may be regularly transferred to the vehicle manufacturer (e.g. via a wired connection during vehicle inspection or via a wireless connection such as a 3G or 4G communication link, see dash dotted line illustrating data link to host 90, which may be under control of the vehicle manufacturer). This data may then, for example, be used by the vehicle manufacturer to optimize/improve the signal processing algorithms used in the central radar processing unit 8. In the depicted example, the monitoring unit may also receive and store data provided by the decision unit 76 and the external ECU 81 (camera and image processing).

To summarize the above explanation, the monitoring unit 77 may be coupled to (or included in) the central radar post processing unit 8 and configured to store, firstly, data (e.g. data representing the radar data cubes) received from at least one of the radar ECUs coupled to the central radar post processing unit 8 and, secondly, associated data representing results or interim results obtained by the radar post processing unit 8, while detecting the radar targets. When using sensor fusing techniques, the monitoring unit 77 may also store information obtained from other (nonradar) sensors (e.g. cameras) and associated with the data received from the at least one radar ECU.

Figure 13:
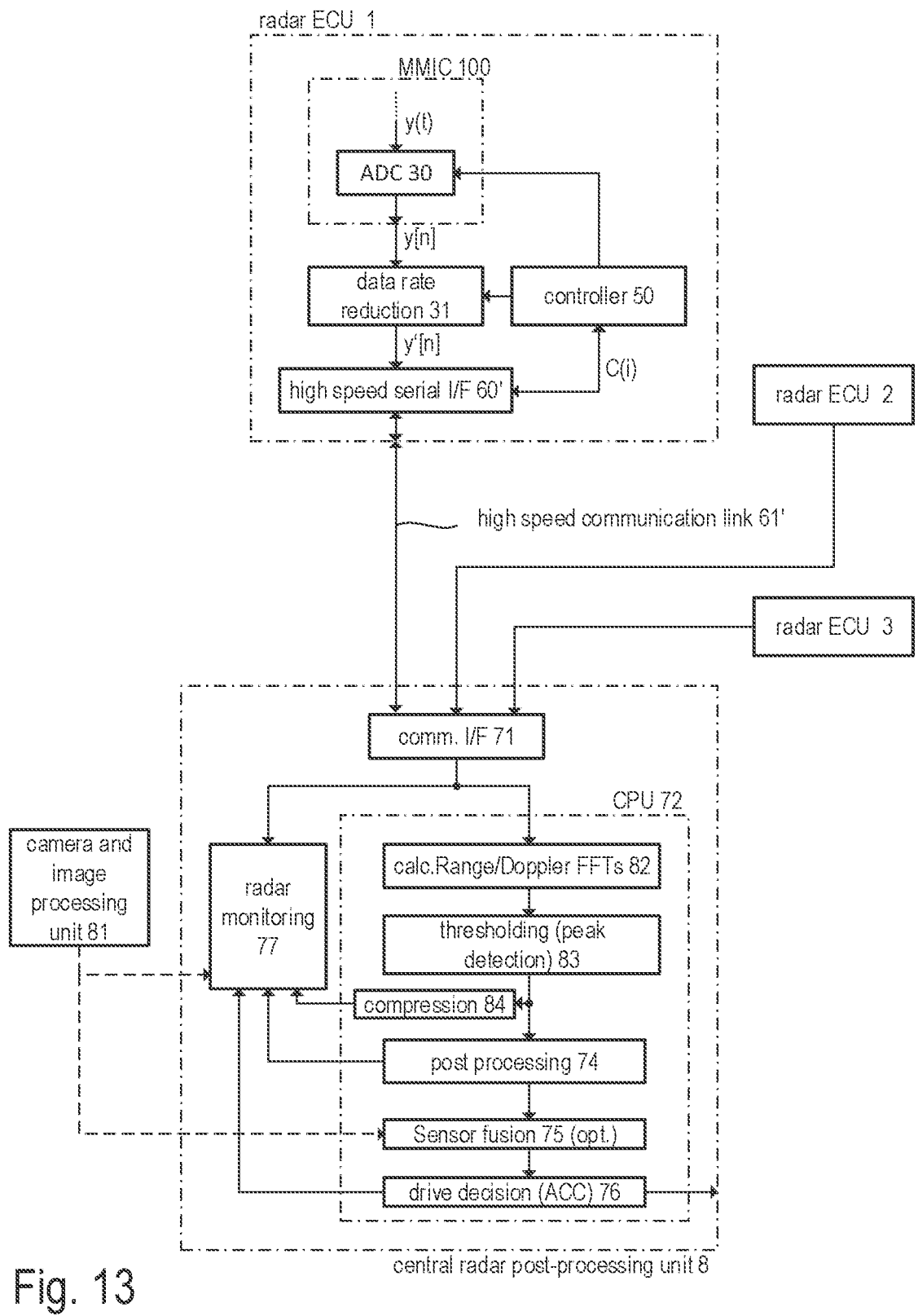
FIG. 13 illustrates another example implementation of the distributed radar sensor system of FIG. 8 in more detail.

FIG. 13 illustrates another example implementation of the distributed radar sensor system of FIG. 8 in more detail. Similar to the example of FIG. 9, one or more radar ECUs (radar sensors) are connected to a central radar post processing unit 8 via a communication link. However, in the present example a high-speed communication link 61' is used to connect radar ECU(s) to the central radar posts processing unit. In this regard "high speed" refers to data rates in the range of gigabits per second. In order to reduce the amount of information to be sent, a data rate reduction is done in the radar sensor using the data rate reduction unit 31. The data rate reduction may be accomplished, for example, by employing a decimator 31 coupled to the ADC 30 downstream thereof. In the example of FIG. 13, the digital signal y[n] provided by ADC 30 represents the raw data sampled at a first (high) data rate and y'[n] represents the corresponding signal with a reduced (lower) data rate, which includes the raw data transferred to the central radar post processing unit 8. The oversampling allows, to improve signal to noise ratio (SNR) and linearity of the analog-to-digital conversion. The decimation ratio used by the decimator 31 may be fixed or adaptively set by the controller 50 of the radar ECU. In such a case, the decimation ratio may be configured by hardware or based on control information received from the central radar processing unit 8.

As the raw data provided by ADC 30, which may be included in the MIMIC 100 used in the radar ECU 1, is transferred to the central radar processing unit 8 without further data compression, the data received by the central radar processing unit 8 may be processed directly by the CPU 72, wherein, in this case, the processing includes performing the computation of the radar data cubes (i.e. FFT computation for generating the Range-Doppler Maps) as well as radar target detection, classification, tracking, etc. In the radar ECUs the digital preprocessing of the digital sensor data is significantly easier than in the previous examples, as no data compression is needed and thus no FFT transforms and peak detection have to be calculated in the radar ECUs. Accordingly, the controller 50 is merely needed for the controlling the data flow and not for signal processing as such.

FIG. 13 also illustrates the functions provided by the central radar processing unit 8, particularly by the CPU 72. Different from previous examples, the computation of the Range-Doppler Maps is done in the central radar signal processing unit 8 (and not decentralized in the radar ECUs). This is possible because the "data compression" performed in the radar ECUs is not based on the detection/selection of FFT peaks but is merely a data rate reduction (decimation) of the raw data stream generated by the individual radar ECUs. Accordingly, the computation of the Range Maps and the Range Doppler Maps (i.e. the radar data cubes) can be relocated to the central radar signal processing unit 8 (see FIG. 13, functional unit 82). Further, the detection/selection of FFT peaks can be relocated to the central radar signal processing unit 8 (see FIG. 13, functional unit 83). The signal post processing (functional unit 74), the sensor fusion (functional unit 75) and the drive decision (functional units 76 and 81) may be implemented in the same or a similar manner as in the previous example of FIG. 12.

In the present example, the central radar signal processing unit 8 may also include a monitoring unit 77, which may be basically implemented in the same manner as in the previous example of FIG. 12. To reduce the amount of data to be stored in the monitoring unit 77, the number of FFT peaks may be reduced by storing only selected FFT peaks, which match one or more given criteria, e.g. which are higher than a specific predefined (e.g. variable) threshold value.

Although the disclosure has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated example implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A system comprising:
   at least one radar sensor comprising:
      a transmitter configured to transmit a radio frequency (RF) signal,
      a receiver configured to:
         receive a back-scattered signal from at least one radar target, and
         provide a corresponding digital radar signal, and
      at least one processor configured to:
         convert the digital radar signal into a frequency domain representation to provide frequency domain data,
         select first frequency domain data from the frequency domain data,
            the first frequency domain data comprising values associated with one or more peaks in the frequency domain data,
         select second frequency domain data, from the frequency domain data, to be discarded in a compression, and
         compress the frequency domain data based on discarding the second frequency domain data to form compressed frequency domain data;
   a central radar signal processing unit connected to the at least one radar sensor, the central radar signal processing unit being configured to:
      receive the compressed frequency domain data,
      decompress the compressed frequency domain data to form decompressed frequency domain data, and
      detect the at least one radar target based on the decompressed frequency domain data; and
   a monitoring unit included in or coupled with the central radar signal processing unit and comprising a memory configured to store data representing the compressed frequency domain data and results from a data processing of the decompressed frequency domain data.

2. The system of claim 1, wherein the frequency domain data and/or the decompressed frequency domain data comprises at least one of a Range Map or a Range-Doppler Map.

3. The system of claim 1, wherein the first frequency domain data includes spectral values of the one or more peaks and neighboring spectral values.

4. The system of claim 3, wherein the second frequency domain data include values of the frequency domain data other than the spectral values of the one or more peaks and the neighboring spectral values.

5. The system of claim 1, wherein the central radar signal processing unit, when decompressing the compressed frequency domain data, is configured to:
   replace a portion of the frequency domain data lost due to the compression by zero padding.

6. The system of claim 1, wherein the central radar signal processing unit, when detecting the at least one radar target, is configured to:
   use at least one artificial neural network to detect the at least one radar target.

7. The system of claim 1, wherein the at least one processor is further configured to:
   determine a direction of arrival based on the frequency domain data.

8. The system of claim 1, wherein the monitoring unit further comprises an interface configured to:
   transfer the data stored in the memory to a host external to the central radar signal processing unit.

9. The system of claim 8, wherein the host is configured to:
   determine a modified signal processing algorithm to be used in the central radar signal processing unit based on the data transferred from the memory to the host.

10. The system of claim 1, wherein the at least one processor, when compressing the frequency domain data, is configured to:
    compress the frequency domain data based on discarding a portion of the first frequency domain data.

11. A method comprising:
    transmitting a radio frequency (RF) signal;
    receiving a back-scattered signal from at least one radar target;
    generating a digital radar signal representing the back-scattered signal;
    providing frequency domain data by converting the digital radar signal into a frequency domain representation;
    identifying first frequency domain data from the frequency domain data,
       the first frequency domain data comprising values associated with peaks in the frequency domain data;
    identifying second frequency domain data, from the frequency domain data, to be discarded in a compression;
    compressing the frequency domain data based on discarding the second frequency domain data to form compressed frequency domain data;
    transmitting the compressed frequency domain data via a communication;
    decompressing the compressed frequency domain data received from the communication to obtain restored frequency domain data;
    detecting the at least one radar target based on the restored frequency domain data; and
    storing, in a memory, data representing the compressed frequency domain data and results from a data processing of the restored frequency domain data.

12. The method of claim 11, wherein the frequency domain data and/or the decompressed frequency domain data comprises at least one of a Range Map or a Range-Doppler Map.

13. The method of claim 11, wherein the first frequency domain data includes spectral values of the one or more peaks and neighboring spectral values.

14. The method of claim 13, wherein the second frequency domain data include values of the frequency domain data other than the spectral values of the one or more peaks and the neighboring spectral values.

15. The method of claim 11, wherein decompressing the compressed frequency domain data comprises:
    replacing a portion of the frequency domain data lost due to the compression by zero padding.

16. The method of claim 11, wherein detecting the at least one radar target comprises:
    using at least one artificial neural network to detect the at least one radar target.

17. The method of claim 11, further comprising:
    determining a direction of arrival based on the frequency domain data.

18. The method of claim 11, further comprising:
    transmitting the data stored in the memory via a communication channel to a host.

19. The method of claim 18, further comprising:
    modifying a signal processing algorithm based on the data transmitted via the communication channel.

20. The method of claim 11, wherein compressing the frequency domain data comprises:
  compressing the frequency domain data based on discarding a portion of the first frequency domain data.

* * * * *